United States Patent
Barajas

[15] 3,677,376
[45] July 18, 1972

[54] BRAKE

[72] Inventor: Joseph W. Barajas, 811 Lovera Blvd., San Antonio, Tex. 78201

[22] Filed: May 18, 1970

[21] Appl. No.: 38,334

[52] U.S. Cl..............................188/341, 188/206 A, 188/327
[51] Int. Cl.......................................F16d 51/22, F16d 65/03
[58] Field of Search..................188/78, 327, 341, 324, 206 A

[56] References Cited

UNITED STATES PATENTS

| | | | |
|---|---|---|---|
| 2,109,013 | 2/1938 | Main et al. | 188/327 X |
| 2,241,728 | 5/1941 | Loweke | 188/341 |
| 2,326,177 | 8/1943 | Schnell | 188/78 |
| 2,484,410 | 10/1949 | Janes | 188/341 |

*Primary Examiner*—Duane A. Reger
*Attorney*—William D. Hall, Elliott I. Pollock, Fred C. Philpitt, George Vande Sande, Charles F. Steininger and Robert R. Priddy

[57] ABSTRACT

A brake mechanism, particularly for trucks and buses, of the type wherein each shoe is independently anchored by a separate anchor pin, wherein the anchor pin of the secondary shoe is modified to have a generally eccentric cross-sectional configuration. The pin fits within a circular hole in the brake shoe, and the arrangement is such as to permit the shoe, when operating as a secondary brake shoe, to move outwardly at its end adjacent the anchor pin in a direction toward the brake drum when actuated. The arrangement does not, however, permit movement of the anchor pin end of the shoe in the opposite direction from its normal position, i.e., in a direction away from the brake drum. The improved mechanism results in increased braking effectiveness, more even wear of the brake lining, and vitually eliminates brake squealing.

6 Claims, 5 Drawing Figures

Patented July 18, 1972
3,677,376
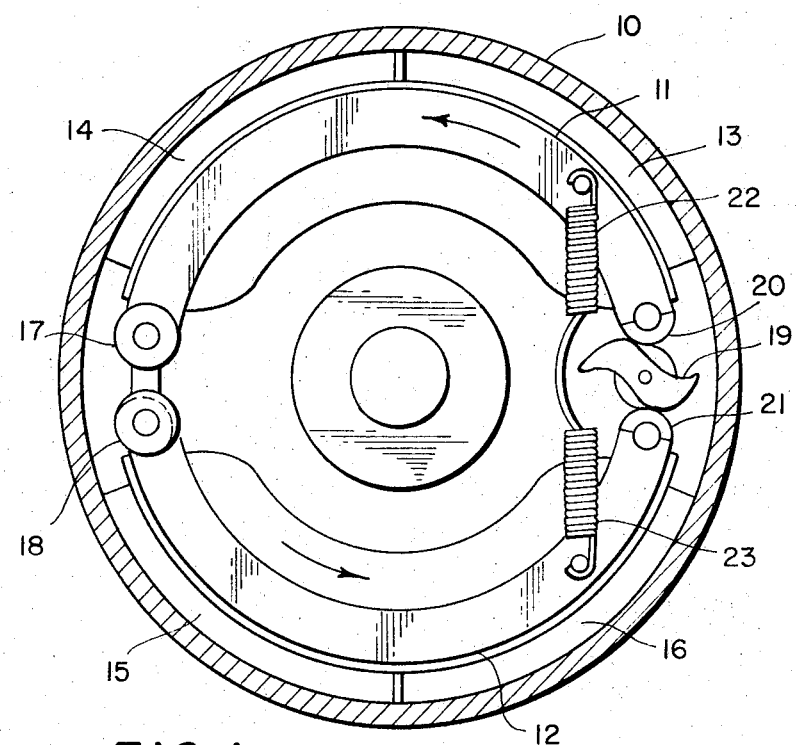
FIG. 1
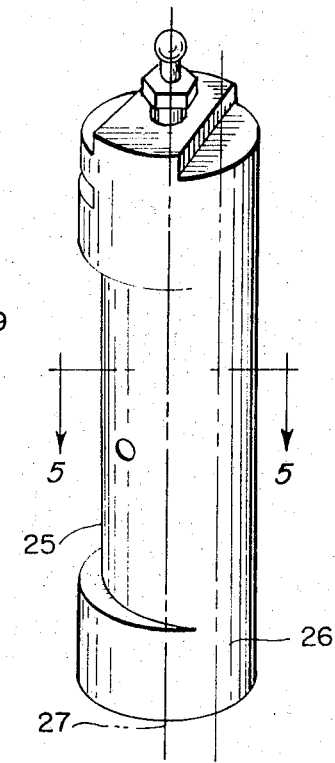
FIG. 2
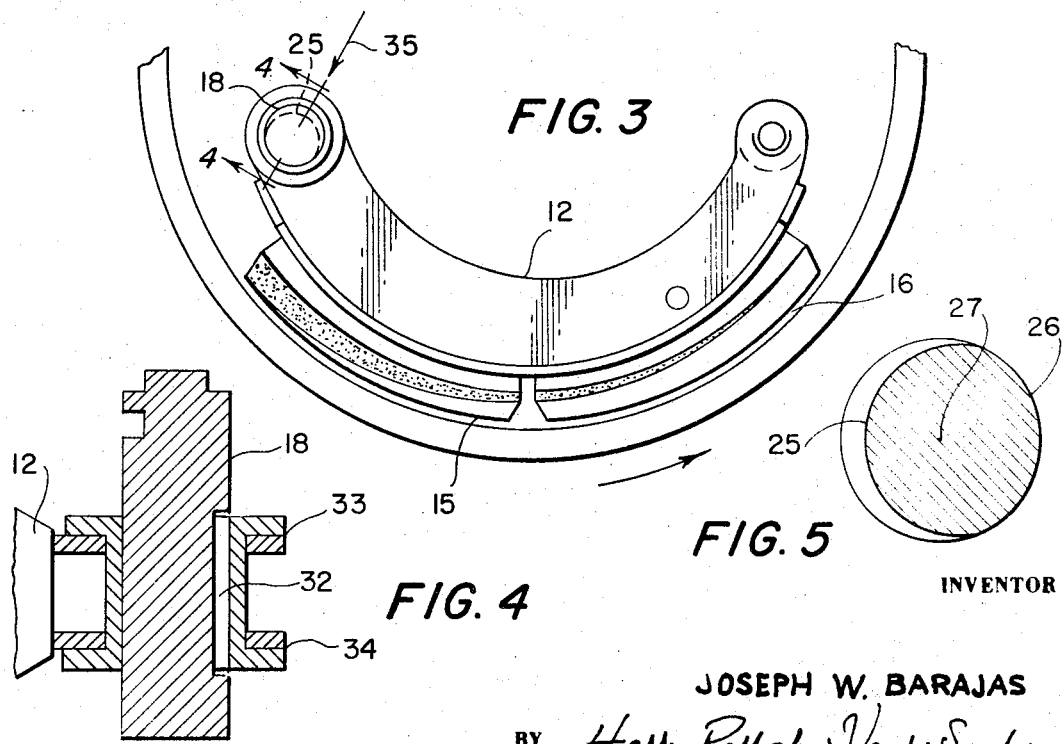
FIG. 3
FIG. 4
FIG. 5
INVENTOR
JOSEPH W. BARAJAS
BY Hall, Pollock & Vande Sande
ATTORNEYS

BRAKE

BACKGROUND OF THE INVENTION

1. Field of Invention

The present invention relates to a vehicle brake mechanism, particularly for trucks and buses, of the type having independently anchored shoes, each anchored by a separate pin. More particularly, the present invention permits the secondary shoe upon actuation to move outwardly at its anchor pin end as well as at its opposite end so that the shoe can bear tightly against the drum over its entire length to reduce the undesirable squealing sound inherent in prior art devices, to increase the braking effectiveness, and to provide a more even wear of the lining over the length of the shoe.

2. Description of the Prior Art

In the field of brake systems for trucks and buses, it has been the general practice to employ two brake shoes each of which pivots on a fixed anchor pin at one end. Both brake shoes are urged outwardly against the drum at the other end during brake application by an S-type cam or standard hydraulic means. The brake operating linkage, however, does not provide sufficient mechanical advantage for positive braking; instead, the mechanical advantage of the braking system is increased by the self-energizing action of the primary shoe. When the vehicle braking system is actuated, that shoe which bears against the brake drum surface moving in the direction from the cam actuating device to the anchor pin becomes the primary shoe and the other shoe is then the secondary shoe. Of course, when the drum rotates in the opposite direction, the primary shoe becomes the secondary shoe and vice versa. The tangential frictional forces acting upon the primary shoe tend to rotate that shoe outwardly about its anchor pin and to wedge the primary shoe tightly against the drum over the entire length of the shoe.

The secondary shoe, on the other hand, experiences no such wedging or self-energizing action since the direction of rotation of the drum surface relative to it is from the anchor pin toward the brake actuating mechanism, and the resulting force vectors on the shoe are such that the force of the shoe against the drum comes about substantially only from the direct force of the brake actuating mechanism. Because of this, the secondary shoe bears most tightly against the drum at its end adjacent the actuating mechanism and much less so at its opposite end. Consequently, the uneven forces cause uneven wear of the brake lining and also annoying brake squeal.

Typical prior art brake devices employ anchor pins which hold the associated end of the shoe fixed, thereby providing the disadvantages set forth above. It is also known in the art to provide an eccentrically rotatable anchor pin which permits adjustment of the shoe position to compensate for lining wear; however, in most such instances, the shoe pivot is fixed relative to the anchor pin so that the disadvantages set forth above are still present. It is also known in the art to provide a brake mechanism in which a generally "floating" shoe construction is provided to permit the tangential force acting on the primary shoe to be at least partially transferred to the secondary shoe so that the latter will have at least some self-energizing action. Such an arrangement is shown, for example, in the patent to Compton, U.S. Pat. No. 2,989,150; however, the present invention can be distinguished from such art by reason of the fact that the two shoes are independently supported and with each shoe being pivotally supported about its anchor pin, thereby readily permitting adaptation of existing braking mechanisms to the arrangement of the present invention so that the advantages thereof may be practiced on existing vehicles. In this connection, it should be noted that the principles of this invention have been applied to numerous vehicles, including the buses of a major municipal transit system, with outstanding success.

SUMMARY OF THE INVENTION

The general purpose of this invention is to provide a brake system which embraces all of the advantages of similarly employed prior art devices and possesses none of the aforedescribed disadvantages. To attain this, the present invention provides a modified anchor pin for the secondary shoe of the brake system, i.e. the shoe which is the secondary shoe for forward movement of the vehicle. The originally circular cross-section pin is modified by removing, as by grinding, a portion of the surface thereof which engages the bushing, in particular, the peripheral portion which otherwise would restrain outward movement of the adjacent end of the shoe against the brake drum. The remainder of the pin's surface is preferably not altered, however, so that it retains its original circular cross-section. The corresponding aperture in the shoe is also not altered so that it retains its circular configuration also. As a result, the shoe is free to move outwardly toward the drum at its anchored end but is restrained from moving inwardly from its normal position. In the preferred embodiment an S-type cam actuating means is used. However, any prior art brake actuating means may be employed.

In the operation of the present invention, when the actuating means is energized, the primary shoe is tightly urged against the drum to impart a self-energizing braking action in the standard manner. At the same time, the actuation of the secondary shoe causes its anchored end to move outwardly toward the brake drum. Such movement can now occur because of the ground-away area of the modified anchor pin. The secondary shoe is thereby now tightly urged against the drum over substantially its entire length rather than primarily only at the actuation end of the shoe. This wedging action of the secondary shoe increases as the cam pressure from the actuating means increases and the secondary shoe is forced still more tightly against the drum.

The ultimate effect of the securing of the secondary shoe with the modified type of anchor pin called for by the present invention permits the secondary shoe to be self-energizing in much the same manner as the primary shoe, thereby increasing the efficiency of the brake system. The use of the modified anchor pin causes more even wearing of the secondary shoe thereby increasing the life of the lining of the primary and secondary shoes; thus, even though the modified anchor pin is used only on the secondary shoe, primary shoe wear is also increased since the greater effectiveness of the secondary shoe requires that less braking effort be exerted by the primary shoe than heretofore.

The type brake which is in current use on many buses and trucks is noted for producing an undesirable squealing sound at times. This undesirable sound has been traced to the fact that the secondary shoe is not urged tightly enough against the drum throughout its length, thereby setting up vibrations which cause the high-pitched undesirable sound. Thus, I have found that the squealing can, in almost all instances, be stopped by merely removing the secondary shoe; of course, such a measure cannot be implemented as a permanent cure for this problem. I have also found that the use of the modified anchor pin of this invention avoids this undesirable sound.

BRIEF DESCRIPTION OF THE DRAWINGS

FIG. 1 is a diagram of an embodiment of the present invention;

FIG. 2 is a diagram of the modified anchor pin used in the present invention;

FIG. 3 is a detailed drawing of the secondary shoe using the modified anchor pin of the present invention;

FIG. 4 is a section of FIG. 3 taken along lines 4—4; and

FIG. 5 is a section of FIG. 2 taken along lines 5—5.

DESCRIPTION OF THE PREFERRED EMBODIMENT

Referring now to FIG. 1, there is shown an embodiment of the present invention having a brake drum 10 arranged to be engaged by primary shoe 11 and secondary shoe 12 for the assumed counternclockwise direction of rotation shown in FIGS. 1 and 3. Primary shoe 11 has brake linings 13 and 14 and secondary shoe 12 has brake linings 15 and 16. Primary shoe 11 is secured by anchor pin 17 and secondary shoe 12 is secured by anchor pin 18. An S-cam actuator 19, operative in conjunction with rollers 20 and 21, is used to actuate the shoes into engagement with drum 10. Brake shoe return springs 22 and 23 restore the brake shoes to the non-actuated position when cam 19 is not activated. The anchor pins 17 and 18 are secured to the brake spider 24 as shown.

FIG. 2 shows the anchor pin called for by the present invention as having a modified portion 25 which may be formed by grinding away a portion of the originally circular peripheral portion of the pin over at least one-half of its original circumference. The remainder of the pin's periphery retains its circular configuration at 26 relative to pin center-line 27. The curvature of this part 26 of the pin closely conforms to that of the corresponding aperture in the respective shoe; consequently, the center of the shoe aperture can move in substantially only one direction relative to the anchor pin axis as determined by the location of the ground-away portion.

FIG. 3 shows the uneven wear pattern, marked in cross-hatch, of linings 15 and 16 of shoe 12, when the unmodified prior art type of anchor pin is used. FIG. 3 further shows the arrangement of the pin 18 with its ground-away portion 25 so oriented toward the center of the brake system as to permit movement of shoe 12 generally in the direction of arrow 35 when the brake is actuated. It is important to note that shoe 12 is still, however, restrained from moving, at its anchored end inwardly, away from drum 10, from its normal, unactuated position and is also generally restrained from moving tangentially as well.

FIG. 4, a sectional view of FIG. 3 taken along section line 4—4 of FIG. 3, shows pin 18 having modified portion 25 engaged by bushing 32. The bushing is connected through ribs 33 and 34 to shoe 12. It is seen that the modified portion 25 permits lateral motion of the bushing 32.

In the operation of the present invention as shown in FIG. 1, the drum rotates in the direction as shown. The brake system is actuated by the clockwise movement of S-type cam 19. The engagement by cam 19 of rollers 20 of primary shoe 11 causes the bushing of the shoe 11 to exert pressure against the unmodified anchor pin 17. The shoe 11 thereby urges its linings 13 and 14 against the drum 10. The movement of the drum 10 in the counter-clockwise direction as shown tends to wedge the linings 13 and 14 against drum 10. This self-energization results in more braking action than could otherwise be obtained from the actuating pressure of cam 19 alone.

The clockwise movement of S-cam 19 against roller 21 further causes the linings 15 and 16 of secondary shoe 12 to be urged against drum 10. The modification of secondary anchor pin 18 permits movement of shoe 12 generally in the direction of arrow 35, so that secondary shoe 12 is urged tightly against drum 10 over its entire length. As indicated, this lateral movement of the shoe relative to the associated bushing is permitted due to the modified portion 25 of anchor pin 18.

It has been found that the present invention embodying the modified secondary shoe anchor pin eliminates the undesirable squealing sound which is inherent in brake systems using an S-type cam actuator. This sound is particularly disturbing when the vehicle on which the brake system is used is operated in an urban environment wherein the vehicle is required to make frequent stops.

Obviously many modifications and variations of the present invention are possible in light of the above teachings. Thus, the invention, in its broadest form, may be said to comprise a means, intended for use in a vehicle brake system of the type having independently anchored brake shoes, which means permits movement of the anchor pin end of the secondary shoe in a direction toward the brake drum while prohibiting movement of the secondary shoe from its normal, non-activated position, away from the drum. Thus, the concept of the invention can also be practiced by, for example, breaking the shoe 12 along the section line 4—4 in FIG. 3 since this will permit the desired floating action just described. Such an arrangement is not preferred, however, because there may then not be adequate support for the secondary shoe at its anchored end to prevent twisting of the shoe under heavy load conditions, and it is believed that this could result in jamming of the brake shoe with unfortunate results.

Another disadvantage of this type of arrangement is that then the secondary shoe is different from the primary shoe, thereby precluding the interchangeability of the shoe which is a desirable characteristic of the preferred embodiment where a standard brake shoe is employed and may be used interchangeably for either the primary or the secondary shoe.

Throughout the description given herein, it has been described that the modified anchor pin is used only in connection with the anchoring of the secondary shoe, and it has been further explained that what is specifically meant is the shoe which is the secondary shoe for forward motion of the vehicle. The anchor pin for the primary shoe can also be modified in the same way if desired, but this is not believed to be in any way necessary since the primary shoe with an unmodified anchor pin provides adequate braking power, does not present any brake squealing problem, and also experiences fairly even wear of the lining. Although the shoe which is normally the primary shoe becomes the secondary shoe for reverse motion of the vehicle, such motion does not occur too frequently with large commercial vehicles, particularly buses, and moreover does not involve operation at any appreciable vehicle speed, and it is for this reason that a conventional circular anchor pin may be used for the primary shoe.

What I claim is:

1. A brake system for vehicles comprising in combination,
   a supporting plate
   a brake drum mounted for rotation relative to said supporting plate,
   a brake actuating device also supported on said plate,
   primary and secondary brake shoes each supporting a brake lining and each having one end pivotally supported on a fixed pivot on said supporting plate and its other end operatively connected to said brake actuating device to permit each shoe to be pivoted about its pivot and into frictional engagement with said brake drum,
   said fixed pivot for said primary shoe prohibiting movement of said one end thereof in a circumferential direction,
   the pivotal supporting means for said secondary shoe comprising an anchor pin secured to said supporting plate and a cooperating aperture in said secondary shoe,
   said pin and said aperture being so contoured relative to each other as to permit movement of the anchored end of said shoe outwardly from its unactuated position toward said brake drum while prohibiting movement of said shoe radially inwardly away from said drum and also restraining movement of said secondary shoe circumferentially relative to said drum.

2. The combination of claim 1 in which said brake shoe aperture is circular and said anchor pin is of eccentric configuration.

3. The combination of claim 2 wherein said anchor pin is of generally circular cross-section with a diameter generally conforming to that of said pin but with said pin having a peripheral portion of its surface removed, said anchor pin being so oriented that the removed portion lies generally inwardly of said supporting plate to permit movement of the anchored end of said shoe outwardly against said drum.

4. The combination of claim 3 wherein the removed portion extends over at least one-half the periphery of said anchor pin.

5. In a self-engaging brake system of the kind having a supporting plate, a brake drum mounted for rotation relative to said plate, primary and secondary brake shoes each supporting a brake lining and each having one end pivotally supported on a fixed pivot on said supporting plate independently of the other shoe, a brake actuating device also supported on said plate, and each said brake shoe having its other end operatively connected to said brake actuating device to permit each shoe to be pivoted about its pivot and into frictional engagement with said brake drum, the improvement which comprises:

said fixed pivot for said primary shoe prohibiting movement at said one end thereof in a circumferential direction, said fixed pivot for said secondary shoe comprising an anchor pin secured to said supporting plate and a cooperating aperture in said secondary shoe, said pin and said aperture being so contoured relative to each other as to permit movement of the anchored end of said shoe outwardly from its unactuated position toward said brake drum while prohibiting movement of said shoe radially inwardly away from said drum and also restraining movement of said secondary shoe circumferentially relative to said drum.

6. The improvement of claim 5 wherein said brake shoe aperture is of circular configuration and said anchor pin is also of generally circular configuration but has a peripheral portion thereof extending over at least one-half of its circumference removed to provide clearance for movement of said brake shoe outwardly toward said drum and away from its normal unactuated position.

* * * * *